(12) United States Patent
Inada

(10) Patent No.: US 8,553,271 B2
(45) Date of Patent: Oct. 8, 2013

(54) PRINTING DEVICE AND CONTROL METHOD FOR A PRINTING DEVICE FOR DISTRIBUTING PRINT DATA

(75) Inventor: Hironobu Inada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1038 days.

(21) Appl. No.: 12/330,423

(22) Filed: Dec. 8, 2008

(65) Prior Publication Data

US 2009/0147312 A1 Jun. 11, 2009

(30) Foreign Application Priority Data

Dec. 10, 2007 (JP) ................................. 2007-318896

(51) Int. Cl.
*G06K 15/00* (2006.01)
(52) U.S. Cl.
USPC ............................. 358/1.18; 358/1.1; 358/1.4
(58) Field of Classification Search
USPC ............... 358/1.1, 1.4, 1.13, 1.16, 1.17, 1.18, 358/400, 401, 296
See application file for complete search history.

(56) References Cited

U.S. PATENT DOCUMENTS 6,663,303 B2 * 12/2003 Horiuchi et al. ................ 400/61
2007/0212146 A1 * 9/2007 Lyons et al. .................... 400/82

FOREIGN PATENT DOCUMENTS

| EP | 0 953 950 A2 | 11/1999 |
|----|---|---|
| JP | 07-336490 A | 12/1995 |
| JP | 11-328534 A | 11/1999 |
| JP | 2002-234215 A | 8/2002 |
| JP | 2003-058950 A | 2/2003 |
| JP | 2007-249391 A | 9/2007 |
| JP | 2009-123028 A | 6/2009 |
| WO | WO 2008/156466 A1 | 12/2008 |

* cited by examiner

*Primary Examiner* — Thomas D Lee

(74) *Attorney, Agent, or Firm* — Kilpatrick Townsend & Stockton LLP

(57) ABSTRACT

A printing device and a control method for a printing device can freely change the distribution of print data to the front and back sides to achieve the desired duplex printing result when operating in a duplex printing page mode that converts the print data for one page after setting the data conversion area. A conversion step (step S29) sets a break length hy that divides the data conversion area 105c into a first data storage area 105a for converting the first-side print data and a second data storage area 105b for converting the second-side print data in the page mode, and then converts the print data. A print step (step S36) then simultaneously prints the first-side or front print data that is converted into the conversion area before the break, and the second-side or back print data that is converted into the conversion area after the break.

14 Claims, 7 Drawing Sheets

FIG. 5A  IF dy > hy
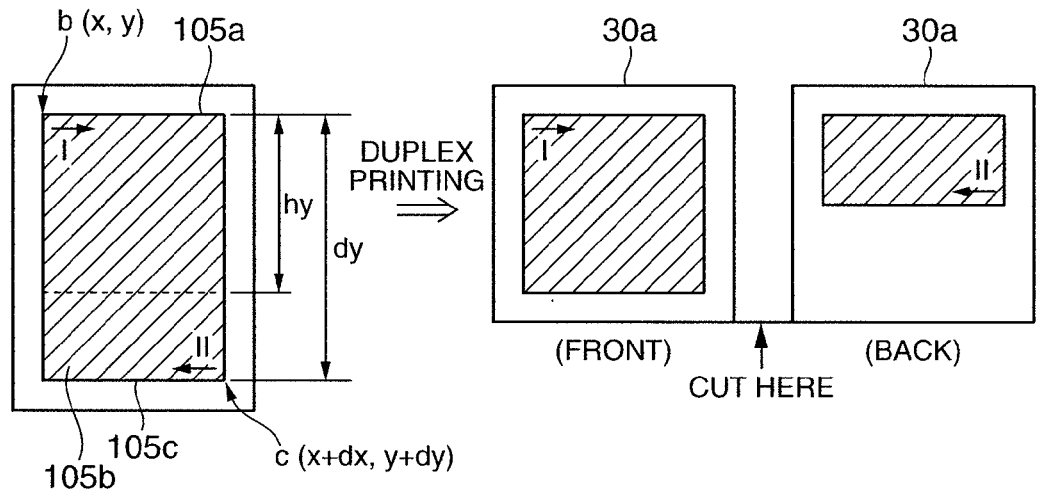
FIG. 5B  IF dy = hy
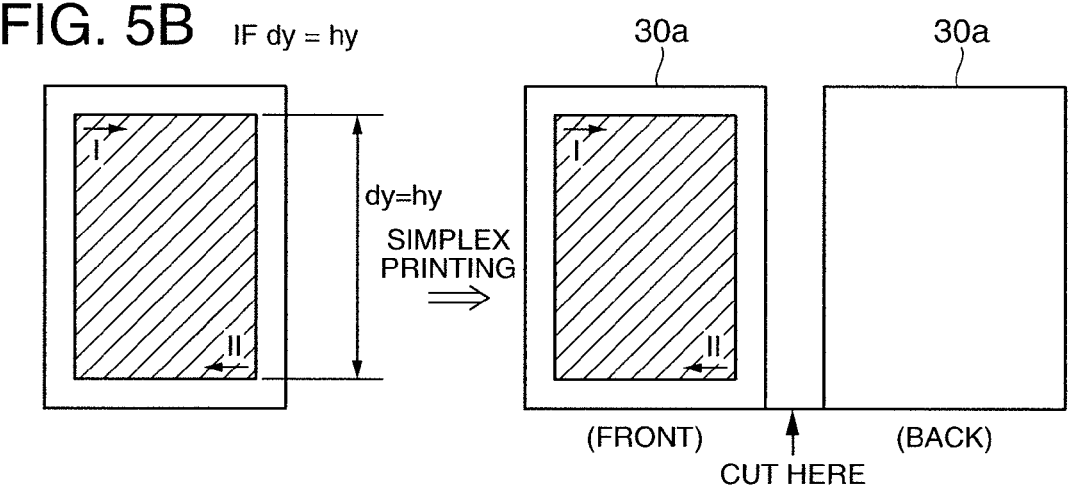
FIG. 5C  IF dy < hy
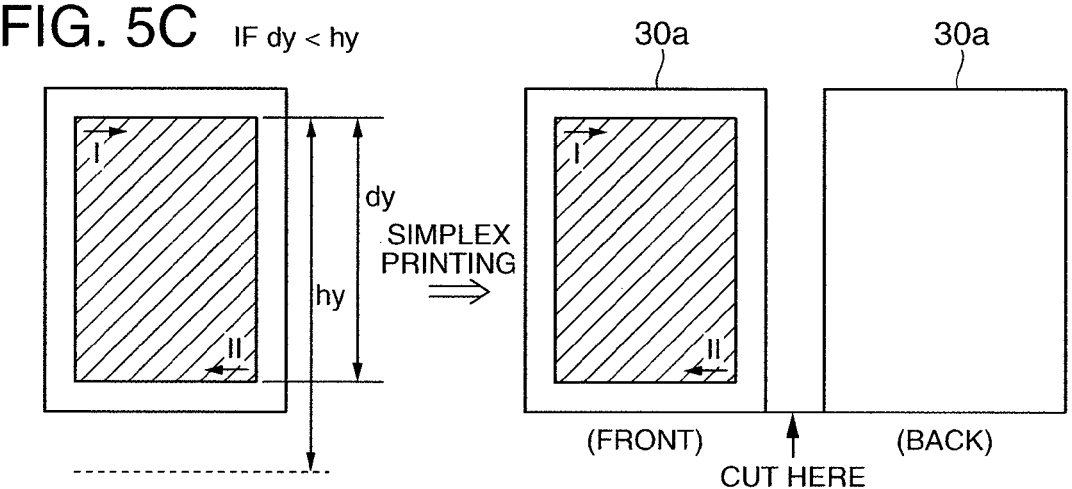

PRINTING DEVICE AND CONTROL METHOD FOR A PRINTING DEVICE FOR DISTRIBUTING PRINT DATA

CROSS-REFERENCES TO RELATED APPLICATIONS

This application claims priority under 35 U.S.C. §119 to Japanese Patent Application No. 2007-318896 filed on Dec. 10, 2007, the entire disclosure of which is expressly incorporated by reference herein.

BACKGROUND

1. Field of Invention

The present invention relates to a printing device that prints on both sides of a print medium and has a page mode for converting one page of print data after setting front and back side print data conversion areas in a data storage device, and to a control method for the printing device.

2. Description of Related Art

Printing devices (simply "printers" below) for printing on both sides of paper or other print medium (commonly called "duplex printing") are taught in Japanese Unexamined Patent Appl. Pub. JP-A-03-027434 and Japanese Unexamined Patent Appl. Pub. JP-A-04-001067.

Japanese Unexamined Patent Appl. Pub. JP-A-03-027434 and Japanese Unexamined Patent Appl. Pub. JP-A-04-001067 teach a printing system that has a repagination unit, an odd-page processing unit, an even-page processing unit, and a reverse-side print processing unit. The repagination unit repaginates and updates the page numbers when a duplex printing command is issued by the host computer. The odd/even page determination unit determines whether a page number is odd or even. If the page number is odd, the odd-page processing unit prints on the front of a sheet and then discharges the sheet into an intermediate holding tray. If the page number is even, the even-page processing unit writes the start address and length of the even page print command string to a control table. The reverse-side print processing unit prints the even pages on the second side of the sheets on which the odd pages have been printed on the first side and are stored in the holding tray.

The host computer issues a duplex printing command to the printing system in order to print on both sides. More particularly, a command must be asserted from the host computer in order to switch between simplex printing and duplex printing. Printers that switch between duplex printing and simplex printing according to the on or off state of a DIP switch are also known from the literature. If the storage capacity of the intermediate holding tray is exceeded during the first-side printing process or the end of a single-sided document is detected when the duplex printing mode is active, operation switches from the first-side printing process to the second-side printing process.

Printers that print to continuous paper such as roll paper are also known. When such printers are used for printing sales receipts to roll paper, the length of the printed data is not constant and the length of each issued receipt varies with each sale transaction. The issued receipt is long when there are many purchased products and there is much information to print, and is short when there are few products (little information). If the roll paper printer can print on both front and back sides of the roll paper and can print long receipts in the duplex printing mode, the length of the issued receipt can be shortened and roll paper consumption can be reduced.

One type of printer used for printing receipts is the line thermal printer. In general, each time a line thermal printer receives print data including one line of print data and a carriage return, it prints the one line and then advances the paper one line. If a carriage return is not included but print data exceeding one line is received, the printer also executes the printer process and advances the paper. One page (one receipt) is printed and output by repeating these steps. This printing process mode is referred to herein as the "standard mode."

Demand for printing receipts and coupons having a greater visual impact on the customer has also grown in recent years. Printers with a wide range of print functions, such as for printing logos, images, and barcodes in addition to text data, and changing the output format by changing the print orientation (page orientation), are also common. In order to provide such diverse printing functions, line printers that have a page mode enabling printing a free-form layout in addition to the standard mode described above are also known from the literature. When the page mode is selected, a prescribed printing area is set in a buffer (memory) enabling converting print data (that is, conversion to data enabling printing by the print head) for at least one full page, all of the print data is converted into the set printing area, and a start printing command is then asserted to start a batch printing process to print all of the data in a single process (print the converted print data by the print head).

Thus setting the printing area enables freely arranging the layout of the print data in the set printing area during conversion. For example, a horizontal layout in which the normal print orientation is horizontal (across the width of the page) can be converted to a vertical layout in which content is printed in the paper feed direction by rotating the print data 90 degrees in the print buffer when converting the print data. The page mode thus enables print functions such as page layouts that cannot be printed in the standard mode, and thus enables more effective receipt printing.

When a printer capable of duplex printing prints both sides, it is also desirable to shorten the length of the issued receipt and reduce paper consumption even when operating in the page mode. In duplex printing, however, the print result is affected by how the first-side data and the second-side data are allocated to the front and back sides. For example, if the break between the first-side data and the second-side data occurs in the middle of an image, the image will be broken into two parts and a receipt or coupon that has a positive visual impact on the user cannot be printed.

If the print data is rotated 90 degrees to the vertical print orientation in the page mode, the desired print output cannot be achieved if one page of data in the printing area is distributed horizontally to the front and back sides. For example, when the data is converted for printing vertically, lines that are longer than the width of the coupon or receipt can be printed in the paper feed direction to one side of the print medium, but if the same data is printed horizontally, the printout will be split.

SUMMARY OF THE INVENTION

A printing device and control method for a printing device according to at least one embodiment of the present invention enable freely changing the distribution of first-side data and second-side data and outputting double-sided printouts as desired when duplex printing is used in a page mode in which a printing area is defined in the print buffer (memory) and one page of print data is then converted for printing. The printing device and control method for a printing device according to at least one embodiment of the present invention also enable duplex printing while keeping the merits of printing vertically in the page mode.

A printing device having a page mode for setting conversion areas for printing a front side and a back side of a print medium in a data conversion area, and converting print data into the conversion areas, a print data conversion unit that sets a break length in the page mode to break the conversion area into a first conversion area in which print data for one side of the print medium is converted, and a second conversion area in which print data for the other side of the print medium is converted, and a printing unit for printing at least one of the print data for the one side converted in the first conversion area, and the print data for the other side converted in the second conversion area, to the corresponding side of the print medium.

A control method for a printing device has a page mode for setting conversion areas for printing a front side and a back side of a print medium in a data conversion area and converting print data, a step of setting a break length in the page mode to break the conversion area into a first conversion area in which print data for one side of the print medium is converted and a second conversion area in which print data for the other side of the print medium is converted, and converting the print data, and printing at least one of the print data for the one side converted in the first conversion area, and the print data for the other side converted in the second conversion area, to the corresponding side of the print medium.

This aspect of the invention sets a break length dividing a first conversion area in which print data for one side of the print medium is buffered and a second conversion area in which print data for the other side of the print medium is buffered. As a result, when the page mode is set to duplex printing, print data can be freely distributed to the one side and the other side so that the desired simplex or duplex printing result can be achieved.

A printing device according to another aspect of the invention also has a print orientation setting unit that sets the print orientation of the print data (the conversion orientation) to either horizontal or vertical where the print medium transportation direction is the vertical direction and the direction widthwise to the print medium is the horizontal direction. The print data conversion unit sets the conversion areas based on the coordinates of the origin of the print medium, the vertical dot count and the horizontal dot count denoting the conversion area coordinate positions of the front side and back side referenced to the origin coordinates, and the vertical break dot count equal to the break length, and the printing unit prints to one side of the print medium when the print orientation is set to horizontal and the vertical dot count equals the vertical break length dot count.

A control method for a printing device according to another aspect of the invention sets the conversion areas are based on the coordinates of the origin of the print medium, the vertical dot count and the horizontal dot count denoting the conversion area coordinate positions of the front side and back side referenced to the origin coordinates, and the vertical break dot count equal to the break length, and prints one side of the print medium when the print medium transportation direction is the vertical direction, the conversion direction is set to horizontal, and the vertical dot count and the vertical break dot count match.

When the print orientation is set to horizontal and the vertical dot count matches the vertical break dot count, the entire data conversion area is set as the first conversion area without dividing the conversion area into a first conversion area and a second conversion area, resulting in simplex printing. A duplex printer can therefore operate in a horizontal simplex printing mode when set to the page mode depending upon the setting of the vertical break dot count.

The printing device according to another aspect of the invention also has a print orientation setting unit that sets the data conversion direction to horizontal or vertical where the print medium transportation direction is vertical and the direction across the width of the print medium is horizontal. The print data conversion unit sets each conversion area based on the origin coordinates of the conversion area, the vertical dot count and the horizontal dot count denoting the conversion area coordinate positions of the front and back sides referenced to the origin coordinates, and the vertical break dot count equal to the break length, and the printing unit prints the conversion data to the vertical break dot count to one side and prints the conversion data following the vertical break dot count to the other side of the print medium when the conversion direction is set to horizontal and the vertical dot count is greater than the vertical break dot count.

The control method for a printing device according to another aspect of the invention sets the conversion areas based on the coordinates of the origin of the print medium, the vertical dot count and the horizontal dot count denoting the conversion area coordinate positions of the front side and back side referenced to the origin coordinates, and the vertical break dot count equal to the break length. This control method also prints the conversion data to the vertical break dot count to one side and prints the conversion data following the vertical break dot count to the other side of the print medium when the print medium transportation direction is set to vertical, the print orientation is set to horizontal, and the vertical dot count is greater than the vertical break dot count.

With this aspect of the invention, if the vertical dot count is greater than the vertical break dot count, the print data up to the vertical break dot count is printed on the front side of the print medium, for example, and the print data following the vertical break dot count is printed on the back side in a duplex printing mode. As a result, the dot count of the acquired print data can be measured to convert the print data to the vertical break dot count into the first conversion area and the print data following the vertical break dot count into the second conversion area.

A printing device according to another aspect of the invention also has a print orientation setting unit that sets the print orientation to horizontal or vertical where the print medium transportation direction is vertical and the direction across the width of the print medium is horizontal. The print data conversion unit sets each conversion area based on the origin coordinates of the conversion area, the vertical dot count and the horizontal dot count denoting the conversion area coordinate positions of the front and back sides referenced to the origin coordinates, and the vertical break dot count equal to the break length. The printing unit ignores the vertical break dot count and prints on one side based on the vertical dot count when the conversion direction is set to horizontal and the vertical dot count is less than the vertical break dot count.

The control method for a printing device according to another aspect of the invention sets the conversion areas are based on the coordinates of the origin of the print medium, the vertical dot count and the horizontal dot count denoting the conversion area coordinate positions of the front side and back side referenced to the origin coordinates, and the vertical break dot count equal to the break length. The control method also ignores the vertical break dot count and prints content to only one side when the print medium transportation direction is set to vertical, the print orientation is set to horizontal, and the vertical dot count is less than the vertical break dot count.

When the vertical dot count is less than the vertical break dot count, this aspect of the invention ignores the vertical break dot count and prints on one side based on the vertical dot count. More specifically, the entire data conversion area is set as the first conversion area instead of dividing the conversion area into first and second conversion areas, resulting in simplex printing. Therefore, even if a value greater than the vertical dot count is erroneously set as the vertical break dot count, simplex printing can proceed using the print data converted into the entire conversion area.

A printing device according to another aspect of the invention has a page mode for setting conversion areas for printing a front side and a back side of a print medium in a data conversion area, and converting print data into the conversion areas; a print data conversion unit for setting a break length in the page mode to break the conversion area into a first conversion area in which print data for one side of the print medium is converted, and a second conversion area in which print data for the other side of the print medium is converted, setting each conversion area based on the origin of the conversion area, the vertical dot count and the horizontal dot count denoting the conversion area coordinate positions of the front side and back side referenced to the origin coordinates, and the vertical break length dot count corresponding to the break length; and converting the print data to the first conversion area and second conversion area; a print orientation setting unit that sets the data conversion direction to horizontal or vertical where the print medium transportation direction is vertical and the direction across the width of the print medium is horizontal; and the printing unit that prints on one side based on the set vertical dot count when the conversion direction is set to vertical regardless of whether the vertical dot count and the vertical break dot count are the same or not, and prints on the other side when the conversion data from the first side continues.

A control method for a printing device according to another aspect of the invention has a page mode for setting conversion areas for printing a front side and a back side of a print medium in a data conversion area, and converting print data into the conversion areas; a step of setting a break length for breaking the conversion area into a first conversion area in which print data for one side of the print medium is converted, and a second conversion area in which print data for the other side of the print medium is converted, setting the conversion areas based on the origin of the conversion area, the vertical dot count and the horizontal dot count denoting the conversion area coordinate positions of the front side and back side referenced to the origin coordinates, and the vertical break length dot count corresponding to the break length, and converting the print data into the first conversion area and second conversion area; and a step of printing on one side based on the set vertical dot count regardless of whether or not the vertical dot count and the vertical break dot count match, and also printing on the other side if there is a continuation of the converted data on the one side, when the print orientation is set to vertical where the print medium transportation direction is the vertical direction and the direction widthwise to the print medium is the horizontal direction.

When the print orientation is set to vertical, this aspect of the invention does not consider the set vertical break dot count regardless of whether the vertical dot count and the vertical break dot count match, and recognizes the print data as one page of data to be printed on one side of the print medium without dividing the conversion area into first and second conversion areas. As a result, vertically oriented printout is not broken horizontally, and duplex printing can proceed while retaining the usual merits of vertically oriented printing.

Furthermore, because the data conversion area is not divided, the entire data conversion area is set as the first conversion area. A second conversion area with at least the same conversion capacity as the first conversion area can also be set in another area separate from the data conversion area. As a result, data for one side can be converted to a vertical orientation in the first conversion area, other data can be converted to a vertical orientation in the second conversion area, and twice as much data as the conventional conversion area can be printed on both sides.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5A, FIG. 5B, and FIG. 5C schematically show examples of the printout when the print orientation of the printing device according to the first embodiment of the invention is horizontal.

DESCRIPTION OF THE EXEMPLARY EMBODIMENTS

Preferred embodiments of at least one embodiment of the present invention are described below with reference to the accompanying figures.

Figure 1:
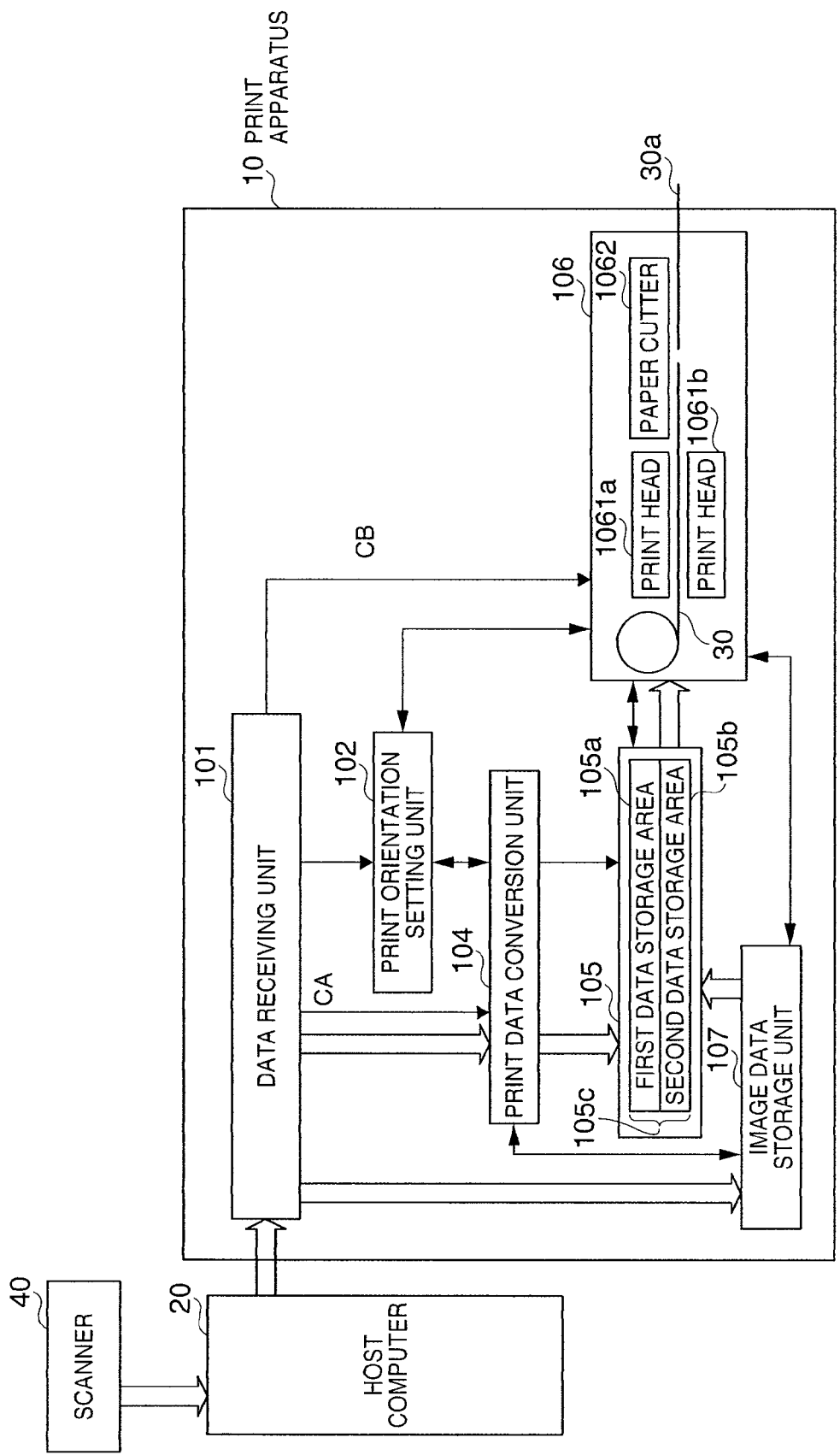
FIG. 1 is a schematic block diagram of a printing device according to a first embodiment of the invention.

FIG. 1 is a schematic block diagram of a printing device according to a first embodiment of the invention. As shown in FIG. 1, a host computer 20 is installed in a convenience store, supermarket, or other store and is connected to a scanner 40 for acquiring product data from a barcode, for example. The product data acquired by the scanner 40 is sent to the host computer 20. The host computer 20 generates print data for a receipt when one transaction process is completed, and sends the print data to the printer 10.

The printer 10 prints on one side or both sides of a printing medium (such as roll paper or other type of continuous media) according to print data sent from the host computer 20. The printer 10 in this embodiment of the invention is a line thermal printer that has both front and back print heads and prints on one or both sides of the print medium. The printer 10 has a standard mode and a page mode.

In the standard mode the printer 10 receives print data and carriage returns by line unit (that is, line by line), and prints and advances the paper accordingly. If print data is received without a carriage return, the printing process and paper feed steps repeat while automatically breaking the print data into line units based on the paper width when print data equal to at least two lines is received.

In the page mode, a prescribed data conversion area enabling converting at least one page of print data including both front and back sides is set in the print buffer, the print data is converted in the set conversion area to data that can be printed by the print heads, and printing then starts when a start printing command is received.

When a command setting the printing process mode to the standard mode or page mode is received from the host computer 20, the print data can be converted in the specified mode. The page mode is set in the operation described below.

The printer 10 according to this embodiment of the invention has a data reception unit 101, a print orientation setting unit 102, a print data conversion unit 104, a print data storage unit 105, a image data storage unit 107, and a printing unit 106.

The data reception unit 101 receives and passes print data sent from the host computer 20 to the print data conversion unit 104. The data reception unit 101 also interprets the received print data, and if a printing area setting command CA is detected, inputs the detected command CA to the print data conversion unit 104. If a start printing command CB is detected, the command CB is input to the printing unit 106. If a print orientation setting command is detected while interpreting the received print data, the print orientation setting command is input to the print orientation setting unit 102.

Figure 2:
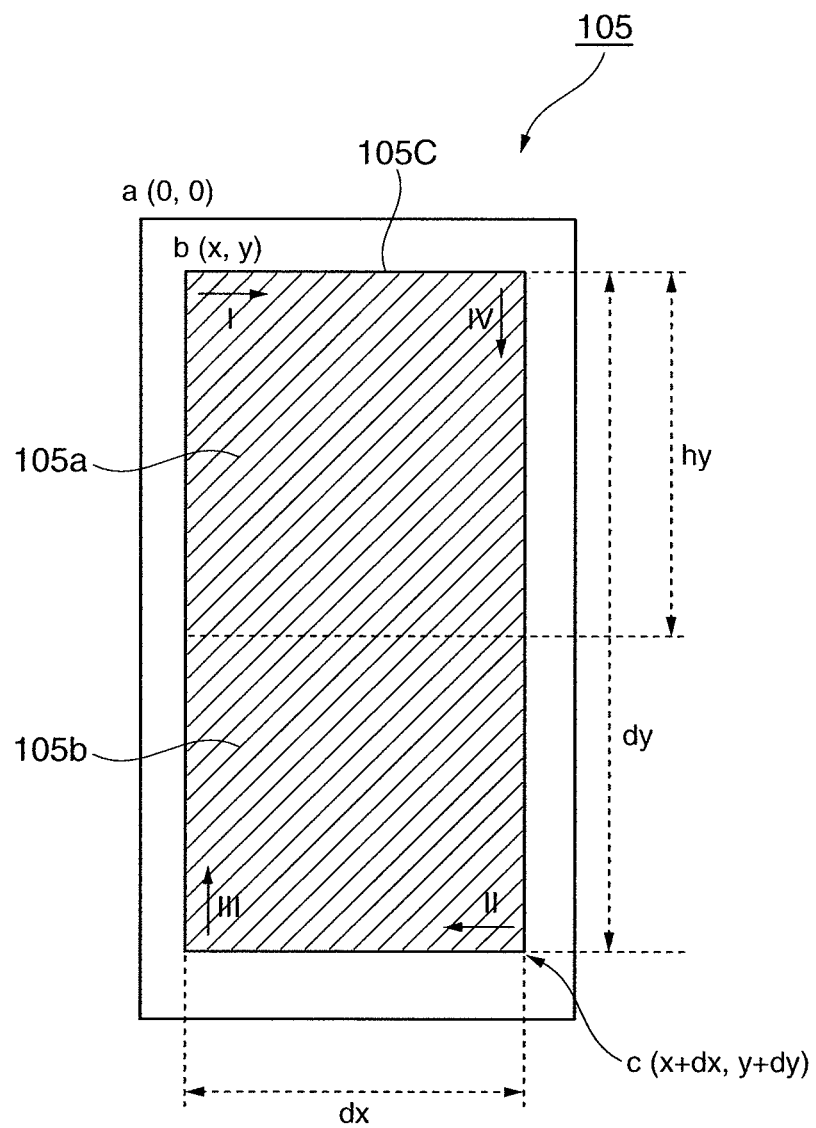
FIG. 2 schematically describes the data conversion area set in the print data storage unit.

The print data conversion unit 104 receives the printing area setting command CA and sets the data conversion area 105c (conversion area) in the data storage unit 105. The data storage unit exists in buffer memory such as RAM. FIG. 2 schematically describes the data conversion area set in the data storage unit. When the printing area setting command CA for setting the data conversion area 105c is input, the entire data conversion area 105c is reserved in the data storage unit 105 while also setting a first data storage area 105a for converting print data for the front or first-side of the print medium, and a second data storage area 105b for converting print data for the back or second-side of the page. The break length hy contained in the printing area setting command CA is used to divide the data conversion area 105c into the first data storage area 105a and second data storage area 105b.

While converting the printing data in the received print data into the respective conversion areas, the print data conversion unit 104 writes the converted print data to predetermined positions. The position to which the converted data is written is measured in dot units based on the coordinates of the origin described below. In addition, when an image data print command for printing image data such as a logo stored in the image data storage unit 107 is received, the image data is extracted from the image data storage unit 107 and converted for printing to the prescribed position in the data conversion area 105c while measuring the dot count.

As shown in FIG. 2, the first data storage area 105a and second data storage area 105b are set based on the absolute origin coordinates a (0,0) of the data storage unit 105, the vertical origin b(x), the horizontal origin b(y), the vertical length dy (vertical dot count), and the horizontal length dx (horizontal dot count) of the data conversion area 105c, and the break length hy (the number of dots to the vertical break point).

The print orientation setting unit 102 sets the print orientation in the page mode according to the print orientation setting command that sets the print orientation. Note that the print orientation as used herein is the direction in which text, for example, in the print data is arranged while the data is converted and written to the data conversion area 105c, and is not the direction in which the print heads travel while actually printing the data while the paper is conveyed. The print orientation can be set to any direction rotating the print data in the data conversion area 105c in 90 degree increments.

As shown in FIG. 2, the print orientation can be changed by changing the direction in which converting the print data starts in 90 degree increments as indicated by arrows I to IV. If the transportation direction of the roll paper 30 is the vertical direction, printing in the directions of arrows I and II is referred to herein as the horizontal direction, and printing in the direction of arrows IV and III is referred to as the vertical direction. Arrow I has its origin at origin coordinates b(x,y), arrow II has its origin at coordinates (x+dx, y+dy), arrow III has its origin at coordinates (x, y+dy), and arrow IV has its origin at coordinates c(x+dx, y). Note that these origins will vary according to factors such as the font used and the line height.

The print data sent from the host computer 20 is converted and written in the data storage unit 105. The image data stored in the image data storage unit 107 is also converted. The image data may be transmitted as print data. In this embodiment of the invention the data for one side (first-side data) and the data for the other side (second-side data) are converted and written in the data conversion area 105c. RAM or other type of nonvolatile memory is typically used for the data storage unit 105.

The image data storage unit 107 stores image data for printing a logo, for example, on the roll paper 30. The image data storage unit 107 may be nonvolatile memory such as EPROM or EEPROM, or volatile memory such as RAM. If nonvolatile memory is used, the defined image data remains in memory even after the printer 10 power turns off, and it is therefore not necessary to redefine the image data. If volatile memory is used, however, the defined image data is cleared when the printer 10 power turns off, but new image data can be defined by the image data definition command.

When an image data definition command for storing image data is input from the data reception unit 101, image data is defined and stored in the image data storage unit 107. The image data definition command is a command for linking and storing a key code, the size of the image data, the color, and the actual image data in the image data storage unit 107. More specifically, the image data definition command is a command for prestoring a logo or other image data that requires transferring more data than character data or other text data. It is therefore not necessary to transmit the image data every time the image is to be printed. However, if an illegal value (data outside the definable range) is input as the key code, data size, color, or definition data, or image data exceeding the storage capacity of the image data storage unit 107 is set, the image data is not defined in the image data storage unit 107.

The printing unit 106 includes a front (first-side) print head 1061a and a back (second-side) print head 1061b disposed in opposition with the roll paper 30 therebetween, and a cutting unit 1062 for cutting the roll paper 30. The print heads 1061a and 1061b are line thermal print heads, and the roll paper 30 is fed the distance equal to one line by a transportation mechanism each time the print head prints one line. The operations of printing one line and advancing the paper one line are repeated to continuously print both sides of the roll paper 30 simultaneously.

To print only one side, either one of the print heads 1061a and 1061b is driven to print the one side. Simplex printing and duplex printing may be combined as desired. During duplex printing, both sides are printed simultaneously.

Note that thermal paper is used as the roll paper 30 in this embodiment of the invention. The roll paper 30 is a paper web that is wound into a cylindrical roll, and is used loaded into the printing unit 106.

The printing unit 106 is separated into a part for printing the converted first-side data that is written to the first data storage area 105a having an area equal or shorter than the break length hy, and a part for printing the second-side data that is written to the second data storage area 105b having an area longer than the break length hy in FIG. 2. The data written to the first data storage area 105a and the data written to the second data storage area 105b can thus be printed on the first-side and the second-side, respectively. More specifically, the print head 1061a prints on the front or first-side of the paper based on the converted print data written to the first data storage area 105a, and the print head 1061b prints on the back or second-side based on the converted print data written to the second data storage area 105b.

If the print orientation set by the print orientation setting unit 102 is horizontal and the vertical length dy and the break length hy match, the content is printed with a horizontal orientation on one side of the print medium. If the print orientation set by the print orientation setting unit 102 is vertical, the content is printed in the vertical orientation on both sides of the page regardless of whether the vertical length dy and break length hy match or do not match.

Figure 3:
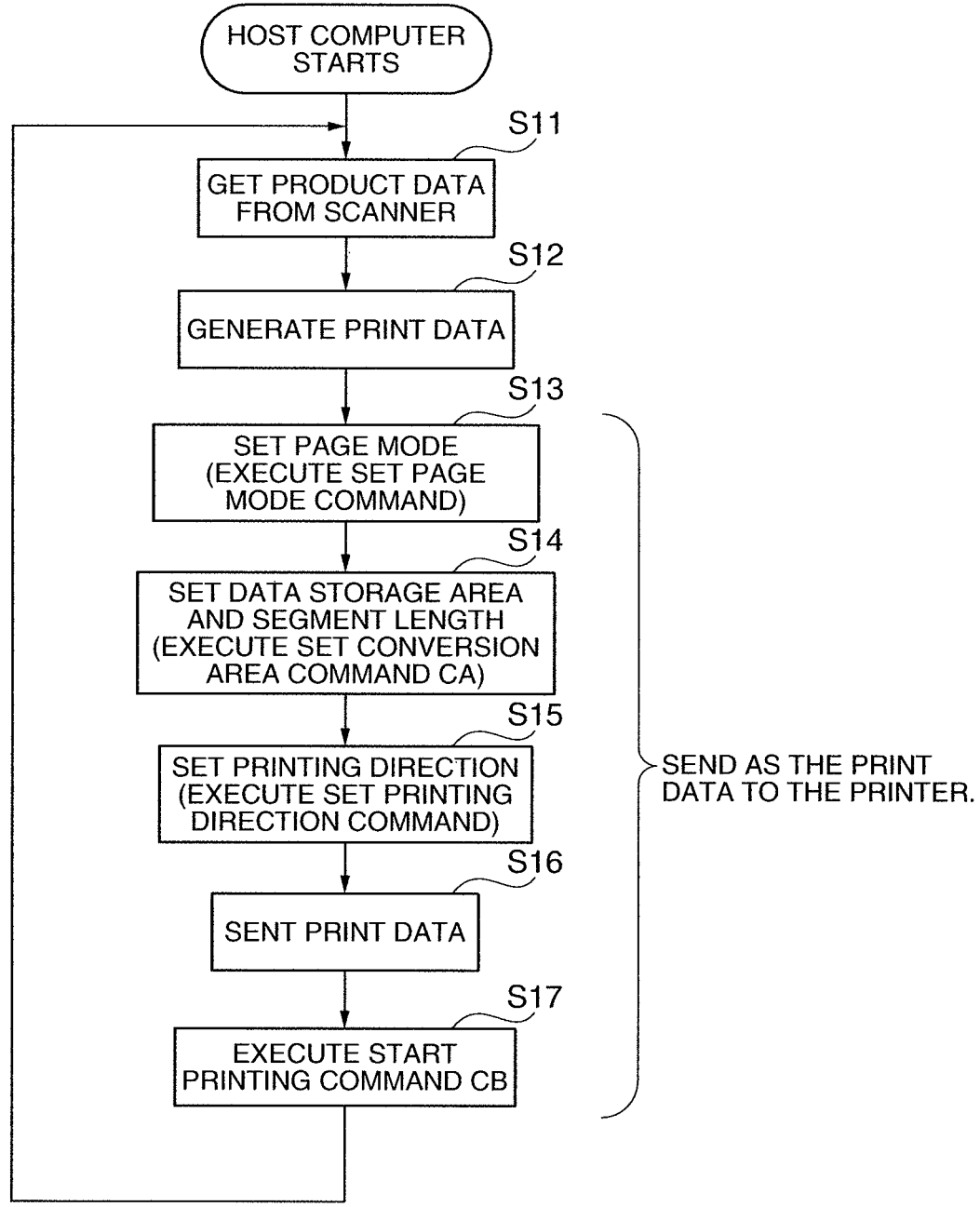
FIG. 3 is a flow chart describing the receipt job printing process executed by the host computer in the first embodiment of the invention.

Operation of the host computer 20 and printer 10 is described next. FIG. 3 is a flow chart describing the receipt job printing process executed by the host computer in a preferred embodiment of the invention.

The first step is to acquire the product data sent from the scanner 40 (step S11) and then generate the print data (S12). If the command setting the printing process mode causes the page mode to be selected (S13), the printing area setting command CA is executed and the data conversion area 105c and break length hy are set (S14). The print orientation setting command setting the print orientation is then executed to set the print orientation (S15).

For example, if the host computer 20 is instructed to set the printing process mode to the page mode, the data conversion area 105c, the break length hy segmenting the data conversion area 105c, and the print orientation are specified, the host computer 20 generates a page mode setting command for configuring the printing process mode, the printing area setting command CA including the break length hy, and a print orientation setting command for setting the print orientation. The resulting commands are then output with the print data to the printer 10 (S16). When the print data is transmitted the start printing command CB is generated and sent to the printer 10 (S17). In this embodiment of the invention the print mode setting command, the printing area setting command CA containing the break length hy, the print orientation setting command, and the start printing command CB are included with the print data to which they apply, and are sent as the print data to the printer 10.

If an image is contained in the print image, an image data print command is also included in addition to the print mode setting command, the printing area setting command CA, the print orientation setting command, and the start printing command CB.

Figure 4:
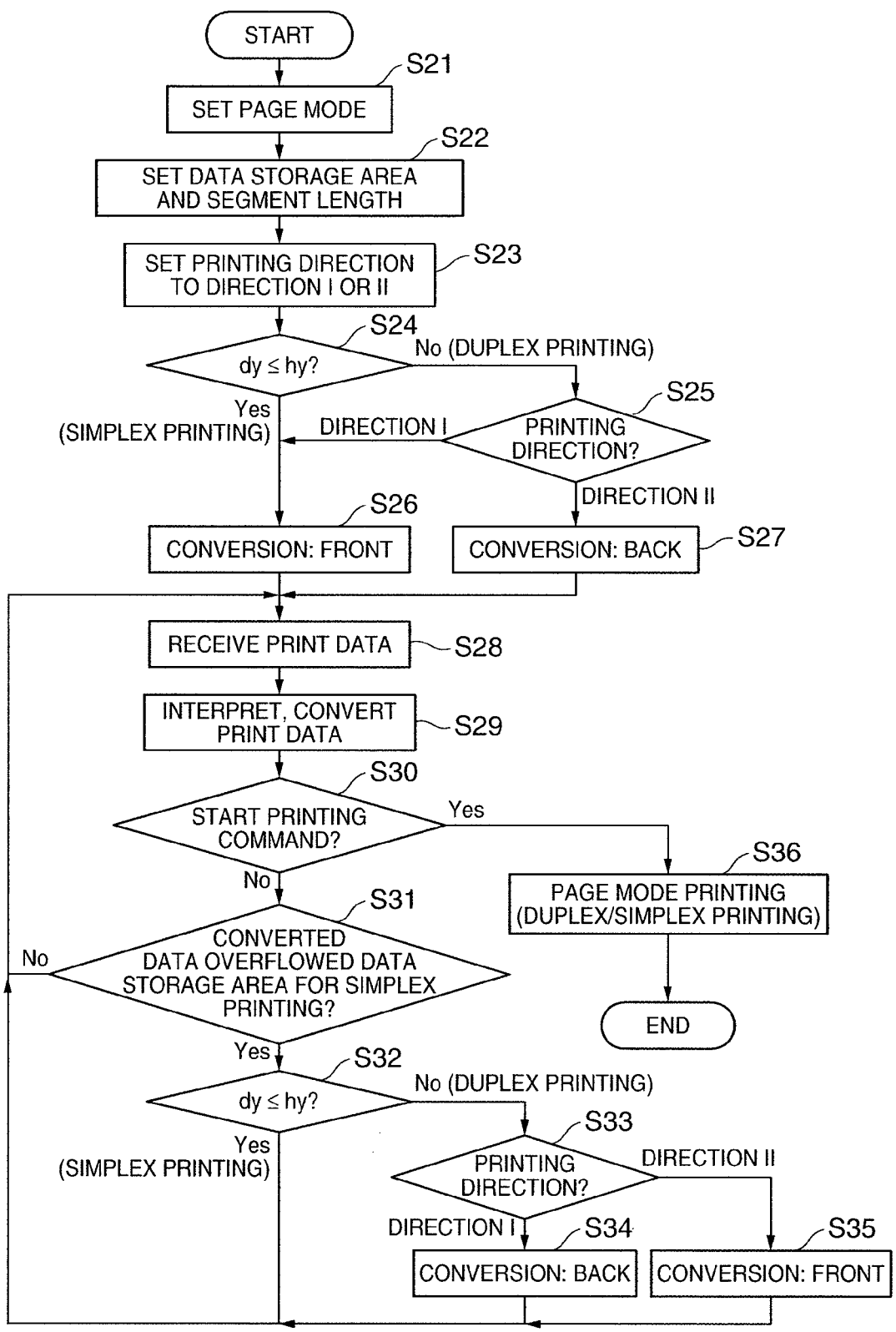
FIG. 4 is a flow chart describing the horizontal printing process executed by the printing device according to the first embodiment of the invention.

Operation when the print orientation is set to horizontal is described first below. FIG. 4 is a flow chart of the horizontal printing process that is executed by the printer according to this embodiment of the invention.

The print data sent from the host computer 20 is received and interpreted, and if the page mode setting command is detected, the printing process mode is set to the page mode (S21). If the printing area setting command CA is detected, the data conversion area 105c is configured in the data storage unit 105 and the break length hy defining the first data storage area 105a and second data storage area 105b is set (S22). If the print orientation setting command is detected, it is input to the print orientation setting unit 102 to set the print orientation to vertical or horizontal.

As shown in FIG. 2, the coordinates b(x,y) of the origin of the data conversion area 105c and the coordinates c(x+dx, y+dy) based on the horizontal length (dot count) dx and the vertical length (dot count) dy of the data conversion area 105c are set, and the data conversion area 105c is divided into the first data storage area 105a and second data storage area 105b at the vertical dot count defined by the break length hy.

If a horizontal orientation (arrow I or arrow II) is set by the print orientation setting command (S23), whether the vertical length dy of the data conversion area 105c is less than or equal to the break length hy is determined. If the vertical length dy is greater than the break length hy (S24 returns No) and the set print orientation is the direction of arrow I (S25: direction I), a buffer area for converting the received print data is set with its origin at origin coordinates b(x,y) as the first data storage area 105a (S26). If the set print orientation is the direction of arrow II (S25: direction II), a buffer area for converting the print data with its origin at coordinates (x+dx, y+dy) is set as the second data storage area 105b (S27).

If the vertical length dy of the data conversion area 105c is less than or equal to break length hy (S24 returns Yes), the buffer area for converting the received print data is set to the first data storage area 105a (S26).

After the data conversion area is set, receiving, interpreting, and converting the received data continue until the start printing command CB is received. The print data is converted into the data conversion area set in step S26 or step S27 (steps S28, S29). Based on the print orientation set in the print orientation setting unit 102, the print data conversion unit 104 converts the print data from the first data storage area 105a when the first data storage area 105a is set, and converts print data from the second data storage area 105b when the second data storage area 105b is set.

The print data conversion unit 104 measures the position of the vertical dot count of the data converted in the data conversion area 105c referenced to the absolute origin coordinates a (0,0) or the origin coordinates b(x,y). The print data conversion unit 104 also determines if the converted print data exceeds the capacity of the data conversion area during conversion (S31). More specifically, if the print orientation is direction I, the print data conversion unit 104 determines if the converted print data exceeds the first data storage area 105a. If the print orientation is direction II, the print data conversion unit 104 determines if the converted print data exceeds the second data storage area 105b.

If the converted print data exceeds the first data storage area 105a or second data storage area 105b (S31 returns Yes), the vertical length dy is greater than the break length hy (S32 returns No), and the print orientation is set to direction I (S33: direction I), the data conversion area for converting the print data is changed from the first data storage area 105a set in step S26 to the second data storage area 105b (S34).

If the print orientation is already set to direction II (S33: direction II), the data conversion area for converting the print data is changed from the second data storage area 105b set in step S27 to the first data storage area 105a (S35).

Receiving, interpreting, and converting the received data continue until the start printing command CB is received, and when the start printing command CB is received (S30 returns Yes), the printing unit 106 starts duplex printing (S36). More specifically, the one print head 1061a prints on the front side based on the converted print data from the leading vertical edge of the first data storage area 105a to the break length hy, and the other print head 1061b prints on the back side based on the converted print data following the break length hy.

FIG. 5A, FIG. 5B, and FIG. 5C schematically describe the printout resulting when the print orientation is horizontal (arrows I and II). As shown in FIG. 5A, when the print orientation is set to arrow I, the output in direction I is printed on both the front and back sides of the roll paper 30. If the print orientation is set to arrow II, the output in direction II is printed on both the front and back sides of the roll paper 30. The printing process in this embodiment of the invention thus prints on both sides, but because the print data located before the break length hy is longer than the print data following the break, the printout 30a cut off from the roll paper 30 is the length of the data on the front (first) side.

However, if the print orientation is set to horizontal in direction I or II and the set break length hy is the same as the vertical length dy of the data conversion area 105c, the data conversion area 105c will match the first data storage area 105a. As a result, in step S31 the converted print data will not exceed the data conversion area of the first data storage area 105a (S31 returns No). As a result, when the start printing command CB is received, simplex printing proceeds based on the print data converted in the data conversion area 105c, which equals the first data storage area 105a in this situation (S36).

As shown in FIG. 5B, when the print orientation is set to direction I, the content is printed in direction I on the front of the roll paper 30. If the print orientation is set to direction II, the content is printed in direction II on the front of the roll paper 30. As thus described, when the vertical length dy and break length hy are the same, the content is printed on one side, and the length of the printout 30a cut from the roll paper 30 will correspond to the vertical length dy of the set data conversion area 105c.

If the print orientation is set to horizontal in direction I or II and in step S32 the set vertical length dy of the data conversion area 105c is shorter than the break length hy (S32 returns Yes), the break length hy is set beyond the data conversion area 105c. In this situation the set break length hy is ignored and the second data storage area 105b is not set. As a result, the print data is converted into the first data storage area 105a and is printed on one side.

As shown in FIG. 5C, when the print orientation is set to direction I, the content is printed in direction I on the front of the roll paper 30. If the print orientation is set to direction II, the content is printed in direction II on the front of the roll paper 30. As thus described, when the vertical length dy is less than the break length hy, the content is printed on one side, and the length of the printout 30a cut from the roll paper 30 will correspond to the vertical length dy of the set data conversion area 105c.

Figure 6:
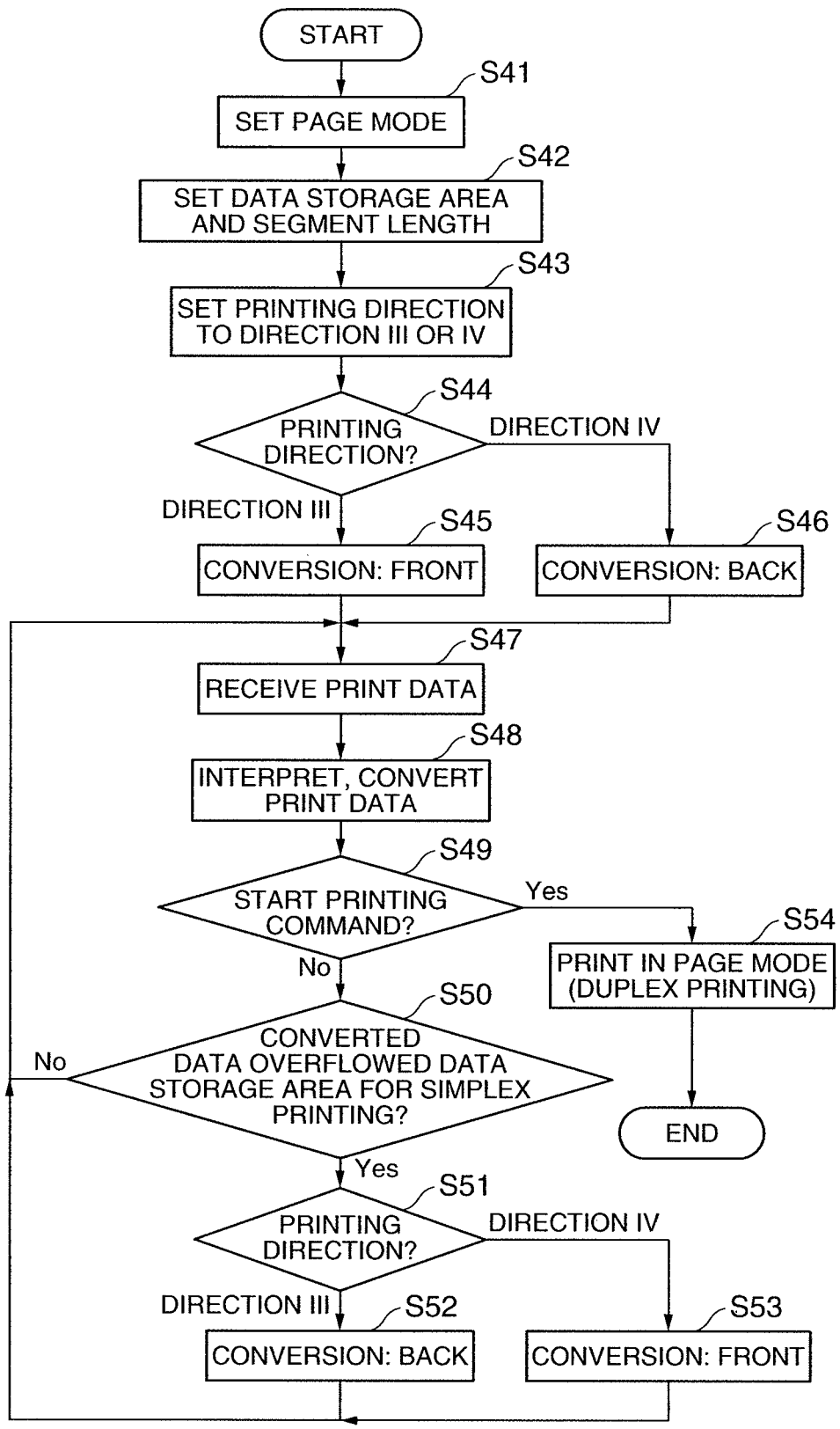
FIG. 6 is a flow chart describing the vertical printing process executed by the printing device according to the first embodiment of the invention.

Operation when the print orientation is set to vertical is described next. FIG. 6 is a flow chart of the vertical printing process that is executed by the printer according to this embodiment of the invention.

The print data sent from the host computer 20 is received and interpreted, and if the page mode setting command is detected, the printing process mode is set to the page mode (S41). If the printing area setting command CA is detected, the data conversion area 105c is configured in the data storage unit 105 and the break length hy defining the first data storage area 105a and second data storage area 105b is set (S42). If the print orientation setting command is detected, it is input to the print orientation setting unit 102 to set the print orientation to vertical or horizontal.

If the page mode is set with a vertical print orientation, the horizontal length of the data conversion area 105c set by the printing area setting command CA containing the break length hy is twice the defined horizontal length dx or 2dx.

Figure 7:
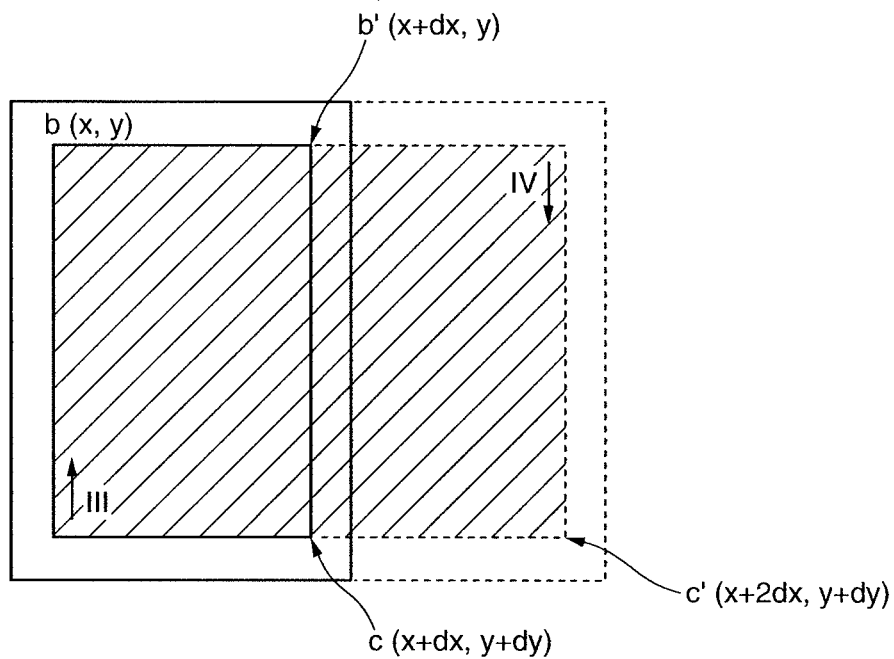
FIG. 7 schematically describes the data conversion area set in the print data storage unit when the print orientation is set to vertical.

FIG. 7 schematically describes the data conversion area set in the data storage unit when the print orientation is set to vertical. As shown in FIG. 7, if the origin coordinates b(x,y) and coordinates c(x+dx, y+dy) are specified, the break length hy is ignored and the data conversion area 105c is set to the area defined by origin coordinates b(x,y) and coordinates c'(x+2dx, y+dy). This means that the area described by origin coordinates b(x,y) and coordinates c(x+dx, y+dy) is set as the first data storage area 105a, and the area defined by coordinates b'(x+dx,y) and coordinates c'(x+2dx, y+dy) is set as the second data storage area 105b.

If a vertical orientation (arrow III or arrow IV) is set by the print orientation setting command (S43) and the set print orientation is the direction of arrow III (S44: direction III), the data conversion area to which the received print data is converted is set to the first data storage area 105a (S45). If the set print orientation is the direction of arrow IV (S44: direction IV), the data conversion area for converting the print data is set to the second data storage area 105b (S46). Arrow III starts at (x, y+dy), and arrow IV starts at (x+dx, y). The precise origins will vary according to the font that is used and the line height, for example.

When the data conversion area is set, receiving, interpreting, and converting the received data continue until the start printing command CB is received. The print data is converted into the data conversion area set in step S45 or step S46 (steps S47, S48). Based on the print orientation set in the print orientation setting unit 102, the print data conversion unit 104 converts the print data from the first data storage area 105a when the first data storage area 105a is set, and converts print data from the second data storage area 105b when the second data storage area 105b is set.

The print data conversion unit 104 measures the position of the horizontal dot count of the data converted in the data conversion area 105c referenced to the absolute origin coordinates a (0,0) or the origin coordinates b(x,y). The print data conversion unit 104 also determines if the converted print data exceeds the capacity of the data conversion area during conversion (S50). More specifically, if the print orientation is direction III, the print data conversion unit 104 determines if the converted print data exceeds the first data storage area 105a. If the print orientation is direction IV, the print data conversion unit 104 determines if the converted print data exceeds the second data storage area 105b.

If the converted print data exceeds the first data storage area 105a or second data storage area 105b (S50 returns Yes) and the print orientation is set to direction III (S51: direction III), the data conversion area for converting the print data is changed from the first data storage area 105a set in step S45 to the second data storage area 105b (S52).

If the print orientation is set to direction IV (S51: direction IV), the data conversion area for converting the print data is changed from the second data storage area 105b set in step S46 to the first data storage area 105a (S53).

Receiving, interpreting, and converting the received data continue until the start printing command CB is received, and when the start printing command CB is received (S49 returns Yes), the printing unit 106 starts duplex printing (S54). More specifically, the one print head 1061a prints on the front side based on the converted print data in the first data storage area 105a, and the other print head 1061b prints on the back side based on the converted print data in the second data storage area 105b.

Figure 8:
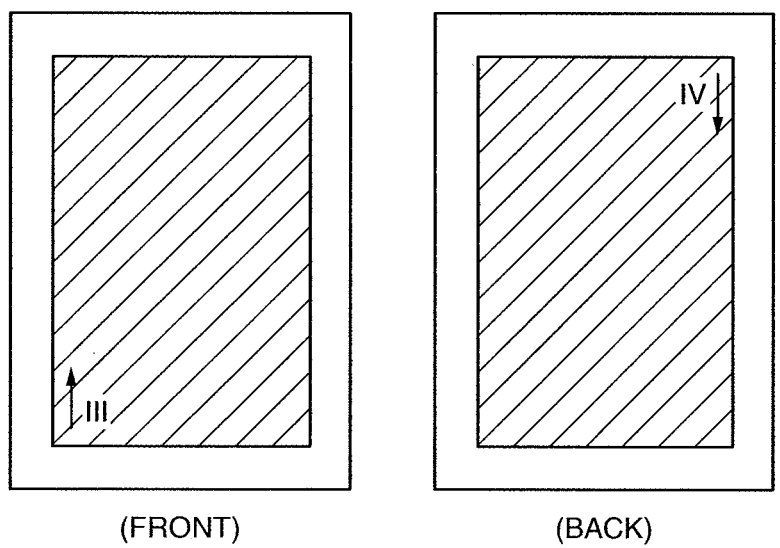
FIG. 8 schematically show an example of the printout when the print orientation of the printing device according to the first embodiment of the invention is vertical.

FIG. 8 schematically describes the printout resulting when the print orientation is vertical (arrows III and IV). As shown in FIG. 8, when the print orientation is set to arrow III, the output in direction III is printed on both the front and back sides of the roll paper 30. If the print orientation is set to arrow IV, the output in direction IV is printed on both the front and back sides of the roll paper 30. The printing process in this embodiment of the invention thus prints on both sides, but the break length hy is ignored and the length of the printout 30a cut off from the roll paper 30 corresponds to the vertical length dy of the set data conversion area 105c.

At least one embodiment of the invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device comprising:
a page mode for setting conversion areas for printing a front side and a back side of a print medium in a data conversion area, and converting print data into the conversion areas;
a print data conversion unit that sets a break length in the page mode to break the conversion area into a first conversion area in which print data for one side of the print medium is converted, and a second conversion area in which print data for the other side of the print medium is converted, wherein the print data conversion unit converts the print data and writes the converted print data to predetermined positions, wherein the print data conversion unit sets the conversion areas based on the coordinates of the origin of the print medium, the vertical dot count and the horizontal dot count denoting the conversion area coordinate positions of the front side and back side referenced to the origin coordinates, and the vertical break dot count equal to the break length; and
a printing unit for printing at least one of the print data for the one side converted in the first conversion area, and the print data for the other side converted in the second conversion area, to the corresponding side of the print medium.

2. The printing device described in claim 1, further comprising:
a print orientation setting unit that sets the print orientation to either horizontal or vertical where the print medium transportation direction is the vertical direction and the direction widthwise to the print medium is the horizontal direction;
and
the printing unit prints to one side of the print medium when the print orientation is set to horizontal and the vertical dot count equals the vertical break length dot count.

3. The printing device described in claim 1, further comprising:
a print orientation setting unit that sets the data conversion direction to horizontal or vertical where the print medium transportation direction is vertical and the direction across the width of the print medium is horizontal;
and
the printing unit prints the conversion data to the vertical break dot count to one side and prints the conversion data following the vertical break dot count to the other side of the print medium when the conversion direction is set to horizontal and the vertical dot count is greater than the vertical break dot count.

4. The printing device described in claim 1, further comprising:
a print orientation setting unit that sets the data conversion direction to horizontal or vertical where the print medium transportation direction is vertical and the direction across the width of the print medium is horizontal;
and
the printing unit ignores the vertical break dot count and prints on one side when the conversion direction is set to horizontal and the vertical dot count is less than the vertical break dot count.

5. The printing device described in claim 1, wherein the first conversion area includes the print data in a first area equal to or shorter than the break length, and wherein the second conversion area includes the print data in a second area extending beyond the break length.

6. The printing device described in claim 1, wherein when the print data is image data, the image data is converted for printing to a prescribed position in the conversion area.

7. A printing device comprising:
a page mode for setting conversion areas for printing a front side and a back side of a print medium in a data conversion area, and converting print data into the conversion areas;
a print data conversion unit for setting a break length in the page mode to break the conversion area into a first conversion area in which print data for one side of the print medium is converted, and a second conversion area in which print data for the other side of the print medium is converted,
setting each conversion area based on the coordinates of the origin of the print medium, the vertical dot count and the horizontal dot count denoting the conversion area coordinate positions of the front side and back side referenced to the origin coordinates, and the vertical break length dot count corresponding to the break length; and
converting the print data to the first conversion area and second conversion area;
a print orientation setting unit that sets the data conversion direction to horizontal or vertical where the print medium transportation direction is vertical and the direction across the width of the print medium is horizontal; and
the printing unit that prints in a vertical duplex printing mode based on the set vertical dot count when the conversion direction is set to vertical regardless of whether the vertical dot count and the vertical break dot count are the same or not, and prints on the other side when the conversion data from the first side continues.

8. The printing device described in claim 7, wherein the first conversion area includes the print data in a first area equal to or shorter than the break length, and wherein the second conversion area includes the print data in a second area extending beyond the break length.

9. The printing device described in claim 7, wherein when the print data is image data, the image data is converted for printing to a prescribed position in the conversion area.

10. A control method for a printing device, comprising:
a page mode for setting conversion areas for printing a front side and a back side of a print medium in a data conversion area and converting print data into the conversion areas;
a step of setting a break length in the page mode to break the conversion area into a first conversion area in which print data for one side of the print medium is converted and a second conversion area in which print data for the other side of the print medium is converted, and converting the print data, wherein the print data conversion unit converts the print data and writes the converted print data to predetermined positions, wherein the print data conversion unit sets the conversion areas based on the coordinates of the origin of the print medium, the vertical dot count and the horizontal dot count denoting the conversion area coordinate positions of the front side and back side referenced to the origin coordinates, and the vertical break dot count equal to the break length; and
printing at least one of the print data for the one side converted in the first conversion area, and the print data for the other side converted in the second conversion area, to the corresponding side of the print medium.

11. The control method for a printing device described in claim 10, wherein:
one side of the print medium is printed when the print medium transportation direction is the vertical direction, the conversion direction is set to horizontal, and the vertical dot count and the vertical break dot count match.

12. The control method for a printing device described in claim 10, wherein:
the conversion data to the vertical break dot count is printed to one side and the conversion data following the vertical break dot count is printed to the other side of the print medium when the print medium transportation direction is set to vertical, the print orientation is set to horizontal, and the vertical dot count is greater than the vertical break dot count.

13. The control method for a printing device described in claim 10, wherein:
the vertical break dot count is ignored and content is printed to only one side when the print medium transportation direction is set to vertical, the print orientation is set to horizontal, and the vertical dot count is less than the vertical break dot count.

14. A control method for a printing device comprising:
a page mode for setting conversion areas for printing a front side and a back side of a print medium in a data conversion area, and converting print data into the conversion areas;
a step of setting a break length for breaking the conversion area into a first conversion area in which print data for one side of the print medium is converted, and a second conversion area in which print data for the other side of the print medium is converted,
setting the conversion areas based on the coordinates of the origin of the print medium, the vertical dot count and the horizontal dot count denoting the conversion area coordinate positions of the front side and back side referenced to the origin coordinates, and the vertical break length dot count corresponding to the break length, and
converting the print data into the first conversion area and second conversion area; and
a step of printing on one side in the vertical direction based on the set vertical dot count regardless of whether the vertical dot count and the vertical break dot count match or not, and also printing on the other side if there is a continuation of the converted data on the one side, when the print orientation is set to vertical where the print medium transportation direction is the vertical direction and the direction widthwise to the print medium is the horizontal direction.

* * * * *